Figure 1:
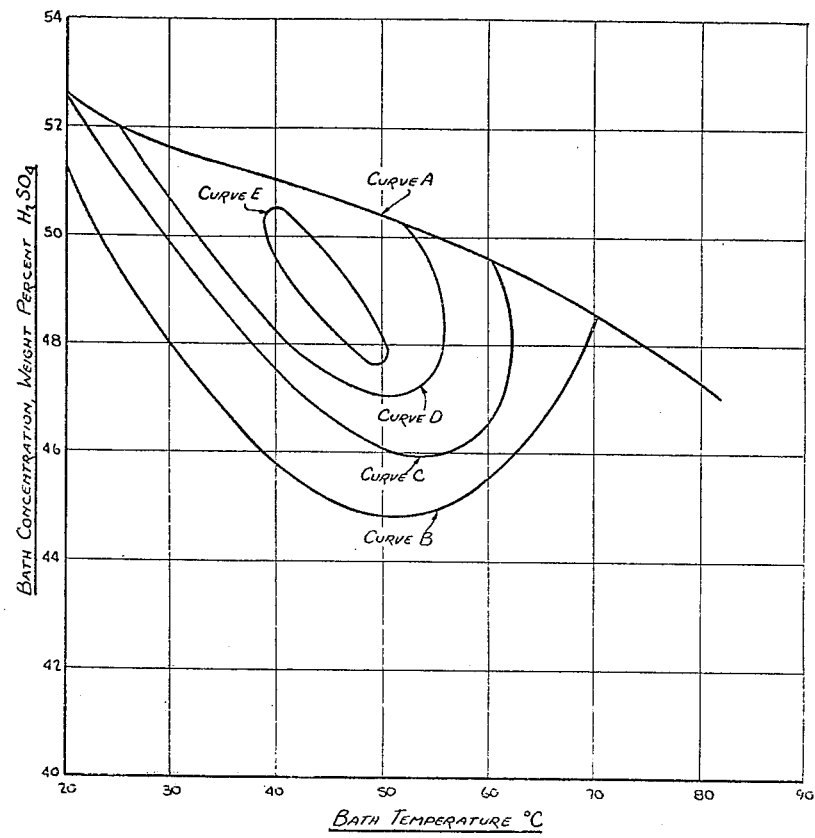

United States Patent Office 3,227,793
Patented Jan. 4, 1966

3,227,793
SPINNING OF A POLY(POLYMETHYLENE) TEREPHTHALAMIDE
Cipriano Cipriani, Morristown, N.J., assignor to Celanese Corporation of America, New York, N.Y., a corporation of Delaware
Filed Jan. 23, 1961, Ser. No. 83,981
8 Claims. (Cl. 264—203)

This application is a continuation-in-part of application Serial No. 11,094, filed February 25, 1960, now abandoned.

This invention relates to an improved process for the formation of shaped articles such as filaments of condensation polymers.

There exists a wide variety of synthetic condensation polymers which are suitable for the manufacture of shaped articles, e.g., filaments and fibers for the manufacture of textiles and other products, and films. Many of these polymers have repeating —CONR— groups, where R is hydrogen or a monovalent organic radical, e.g., a hydrocarbon radical such as lower alkyl. These include the polyamides proper, e.g., the nylons, wherein the

—NRCO— groups are attached to carbon atoms on each side, the polyurethanes which containing repeating —NRCOO— groups, and the polyureas which contain repeating

—RNCONR— groups. The usual method of forming these polymers into shaped articles such as filaments and films is to extrude the melted polymer through suitably shaped openings having at least one thin dimension, e.g., the orifices of a spinnerette in the case of the melt spinning of filaments or a slot in the case of film formation.

While melt spinning and melt extrusion techniques are perfectly suitable for many of the aforementioned polymers, there exist other polymers within the class to which such techniques cannot easily be applied. For example, in the case of high melting polymers, e.g., polyamides proper, melting above 275° C. and polyurethanes and polyureas melting above 179° C., especially above 210° C. and in general where the polymer has cyclic groups, e.g., meta- and para-phenylene, cycloalkylene groups such as 1,4-cyclohexylene and/or heterocyclic groups such as piperazylene as an integral part of the polymer chain, the polymer may begin to degrade seriously at a temperature very close to the melting point and/or the polymer may further polymerize to a useless infusible mass. However, because of the desirable properties of many of these polymers, e.g., a combination of dye receptivity, superior mechanical properties and water insensitivity as indicated, for example, by high wet stiffness and low boil off shrinkage, not often found in the more common polymers which can be melt spun, any method which can be used to form such difficultly meltable polymers into useful shaped articles such as filaments and films is much to be desired.

In accordance with one aspect of the invention a difficultly meltable polymer from the class described above is dissolved in concentrated sulfuric acid suitably having a concentration of 80 to 100, preferably 95 to 100 percent by weight. It has been found that this range of concentration of sulfuric acid is important in obtaining solutions which do not gel and which can be easily and stably formed into useful shaped articles.

The process of this invention may be applied, for example, to fiber forming linear polyamides which melt above 275° C. These polyamides may, for example, have repeating structural units of the formula

—NR—Y—NR'—CO—Y'—CO— which result from the condensation of a dicarboxylic acid or a derivative thereof, e.g., a salt, acyl halide, or ester of such an acid, with a diamine, wherein the R's, which may be the same or different, are hydrogen or monovalent organic radicals, e.g., lower alkyl such as methyl or ethyl, and the Y's, which also may be the same or different, are divalent organic radicals such as alkylene, e.g., ethylene, tetramethylene or hexamethylene, arylene such as para- and meta-phenylene, para- and meta-xylylene, and para- and meta-diethylene benzene, cycloalkylene such as 1,4-cyclohexylene and divalent heterocyclic radicals such as those derived from piperazine, and alkyl and di-alkyl piperazines, e.g., methyl- and dimethyl piperazines and ethyl and diethyl piperazines, wherein the open bonds are attached to the nitrogen atoms, and wherein the chemical structure of the polymer and/or the polymerization technique used is such that a relatively high melting polymer is obtained.

An important group of polyamides within the above group are those in which Y and/or Y' is or contains a para- or meta-phenylene radical or a 1,4-cyclohexylene radical, and particularly important are condensation products of a diamine and terephthalic acid or a derivative of terephthalic acid, e.g., terephthalyl chloride or a dialkyl terephthalate. Some specific polymers within this latter group are poly (polymethylene) terephthalamides wherein the polymethylene groups contain 2 to 10 carbon atoms, e.g., polyhexamethylene terephthalamide, polyoctamethylene terephthalamide, polytetramethylene terephthalamide, polyethylene terephthalamide, and polypiperazylene terephthalamide. Other polyterephthalamides are poly-o-,m, and p-phenylene terephthalamides, poly-o-,m-, and p-xylylene terephthalamides and poly-o-,m and p-diethylenephenylene terephthalamides, the latter produced, for example, by condensing an ester-forming derivative of terephthalic acid with para-bis (beta-aminoethyl) benzene. The polyterephthalamides when shaped in accordance with the invention exhibit a particularly good combination of properties, e.g., mechanical properties such as tenacity and elongation, water insensitivity as indicated by high wet stiffness and low shrinkage, and high sensitivity to disperse and acid dyes.

Also contemplated are high melting autocondensation polymers, e.g., melting above 275° C., of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1-carboxymethyl-4-aminocyclohexane or its lactam, 1-carboxy-4-aminocyclohexane or its lactam and 1-carboxymethyl-3-aminocyclopentane or its lactam.

The polyurethanes contemplated are polymers having repeating structural units of the formula

—NR—Y—NR'—CO—O—Y'—CO—O— resulting for example, from the condensation of a diisocyanate with a dihydric alcohol or phenol or the condensation of a diamine with a bis (chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Particularly preferred are polyurethanes prepared from dihydric alcohols or phenols containing a meta- or para-phenylene or a 1,4-cyclohexylene radical. Some specific polyurethanes which may be used are the condensation product of piperazine with the bis (chloroformate) of bis (p-hydroxyphenyl) propane-2,2, the condensation product of piperazine with the bis(chloroformate) of cis- or trans-1,4-cyclohexylene glycol, the condensation product of piperazine with the bis (chloroformate) of hydroquinone and the condensation product of tetramethylene diamine with the bis(chloroformate) of butanediol-1,4 each of which has a melting point above 210° C.

Polyureas which may be formed into useful shaped articles in accordance with this invention have repeating structural units of the formula

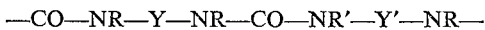

—CO—NR—Y—NR—CO—NR'—Y'—NR— wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha/beta diurea with a diamine, the chemical structure of the polymer and/or the polymerization technique being such that a polymer melting above 179° C., preferably above 210° C. is obtained. Some specific polyureas contemplated are those obtained from hexamethylene diisocyanate plus hexamethylene diamine and from m-phenylene diisocyanate plus m-phenylene diamine, each of which melts above 210° C.

In accordance with another aspect of the invention, shaped articles such as filaments and films of the foregoing polymers are obtained by extruding the solution of the polymer in concentrated sulfuric acid through an enclosed space of predetermined shape having at least one thin dimension into an aqueous solution of sulfuric acid having a concentration considerably lower than that of the acid in which the polymer is dissolved and low enough such that the polymer is coagulated into a shaped article. Moreover, it has been found that the properties of the resulting shaped articles such as filaments which are formed depend on the concentration of the sulfuric acid in and the temperature of the coagulating or spin bath.

The concentration of sulfuric acid in the spin bath may be varied considerably depending on various modifications of the process. However, such concentration, especially when spinning polyterephthalamides such as polyhexamethylene terephthalamide, will in many cases be below 60% by weight, and, in some cases may be as low as 40%. However, concentrations lower than 40% may be used in the presence of additives. The temperature of the spin bath into which the spinning solution is extruded may be, for example, in the range of 20 to 100° C., preferably 40 to 60° C. A suitable concentration of polymer in the spinning solution is in the range, for example, of 5 to 30% by weight and the temperature of the solution which is extruded may be, for example, in the range of 20 to 100° C.

Shaped articles e.g., of polytetrephthalamides such as polyhexamethylene terephthalamide, of particularly desirable properties are obtained when the spin bath concentration and temperature are within certain restricted ranges to be subsequently defined. It has been found that when the polymer solution is wet spun into aqueous sulfuric acid within these ranges in the formation of shaped articles such as filaments, the latter have considerably less lateral order as spun. These filaments which may be considered amorphous, are less brittle and easier to stretch than filaments obtained by other methods which have a substantially greater degree of crystallinity as spun. The use of a spin bath within the specified ranges results in shaped articles which have considerably superior properties, e.g. of tenacity and elogation, than when conditions outside these ranges are used.

In addition to concentrated sulfuric acid having a concentration within the range specified above, fuming sulfuric acid, e.g. containing up to 6 or 7% by weight or even higher of free sulfur trioxide, may be used as the spinning solvent.

The polymer solutions of this invention may also be wet spun into coagulating or spin baths other than aqueous sulfuric acid. For example at temperatures around 20° C. the sulfuric acid solutions of this invention, e.g. of polyhexamethylene terephthalamide may be extruded into aqueous formic acid of 52 to 68% by weight formic acid concentration or into aqueous acetic acid of 52 to 63% by weight concentration. The solutions may also be extruded into spin baths of aqueous formic or acetic acid of considerably higher temperature e.g. 35 to 55° C. in which case lower acid concentrations may be used.

The spin bath liquid may be circulated so that it travels cocurrent with the filaments, e.g. in a tube in order to minimize turbulence in the liquid surrounding the filaments and thus prevent rupture or in the case of multifilament spinning, adhesion of the filaments to each other. This is especially useful for processes wherein the spun filaments travel in a generally horizontal direction.

Another modification which is particularly useful for horizontal spinning is to cause a gentle upward stream of spin bath liquid in the vicinity of the spinnerette. This minimizes sag in the filaments caused by the fact that the material being extruded has a considerably higher specific gravity than the liquid of the spin bath.

The wet spinning process of this invention, especially when the spin bath is aqueous sulfuric acid, results in little or no degradation of the polymer as indicated by its inherent viscosity, particularly when the concentration of $H_2SO_4$ in the solvent is at least 90% and the spinning solution is not subjected to elevated temperatures for long time periods. For example, when a polymer such as polyhexamethylene terephthalamide is formed into filaments by means of such process, its inherent viscosity as measured from a dilute solution in concentrated sulfuric acid does not in general fall more than 0.15 deciliter per gram. This is in contrast to many conventional wet spinning processes. Thus, in spinning polyhexamethylene terephthalamide having an inherent viscosity of above 1.0 or 1.3 deciliter per gram filaments may be obtained of polymer having an inherent viscosity of above 0.85 or 1.15 deciliter per gram respectively. One method of forming a polyamide, e.g. polyhexamethylene terephthalamide, suitable for spinning in accordance with the process of this invention is to contact an aqueous solution of the corresponding diamine with a solution in a water-immiscible organic solvent of the corresponding acid chloride in the presence of a water insoluble acid binder such as magnesium oxide, e.g., as more fully described in commonly assigned application Serial No. 6,885, filed February 5, 1960 and now abandoned.

Filaments may be produced with the process which have widely varying deniers, e.g. in the range of 0.1 to 50, preferably 1 to 16 denier per filament. While filaments extruded from round orifices have in general a round smooth cross-section, filaments having other cross-sectional shapes may be produced by means of orifices having other than round shapes. The filaments, e.g., of polyhexamethylene terephthalamide, have a generally similar appearance throughout different portions of their interior as determined by the examination of different cross-sections of these filaments with an optical microscope. The filaments may have a number of small voids uniformly distributed throughout their interiors or they may be substantially completely voidless.

The smooth filaments which are produced in accordance with this invention may be easily distinguished from filaments produced by other methods which are tubular and have a serrated, irregular cross-section. The filaments of this invention may thus be suitable, for example, in tire cord where their smooth cross-section enables them to be packed very tightly to form a dense, strong cord. The filaments, may, of course be used in other applications e.g. the preparation of textiles, non-wovens, etc.

The following examples further illustrate the invention. All percentages are by weight unless otherwise indicated.

Example I

To a solution of 0.88 percent by weight of hexamethylene diamine in 3000 ml. of water were added 25 grams of magnesium oxide and a solution of 1.65 percent by weight of terephthaloyl chloride in 3000 ml. of xylene with vigorous agitation. Agitation was continued for approximately 30 minutes. The precipitated polyhexamethylene terephthalamide which had an inherent viscosity of 1.3 measured in concentrated sulfuric acid was filtered and dried at 50° C.

The above polymer was dissolved at room temperature in concentrated sulfuric acid of 96 percent by weight concentration to yield a spinning solution of 14.9 percent by weight of polymer and a viscosity of 2420 poises at 30° C., the viscosity being measured by a Sychro-Lectric viscometer. The solution was extruded through a one hole jet having a diameter of 100 microns into an open trough containing a spin bath of aqueous sulfuric acid having a concentration of 47.5% by weight, and which was at a temperature of 50° C., using a spinning speed of 54 meters per minute. Mounted adjacent to the spinnerette on each of its sides to prevent turbulence in the vicinity of the latter were two parallel plates of "Plexiglas" each 12 inches long, about 1 inch apart and extending from the bottom of the spin bath trough to a height of 4 inches, which was greater than the height of the jet. The spin bath length was 1 meter and the velocity of the spin bath cocurrent with the filaments varied between 1 and 2 meters per minute. After washing with water until acid free to methyl orange and then drying in warm air in the relaxed state, the filaments as spun were found to have a denier per filament of 3.2, a tenacity of 2.0 grams per denier, an elongation of 92% and a tensile factor of 20 (average of 5 filaments), the tensile factor being defined as the product of the tenacity in grams per denier and the square root of the percent elongation.

Example II

The procedure of Example I was followed except that the spinning solution had a polymer concentration of 15% by weight and a viscosity of 2500 poises at 30° C., the spin bath had a concentration of 49.0% by weight of sulfuric acid and a temperature of 45° C., and the spinning speed was 50 meters per minute. The filaments as spun were 2.8 denier per filament and had a tenacity of 2.3 grams per denier, an elongation of 79% and a tensile factor of 20 (average of 55 filaments).

Example III

The procedure of Example I was followed except that the spinning solution had a polymer concentration of 15% by weight and a viscosity of 2400 poises at 28° C., the spin bath had a concentration of 49.0% by weight of sulfuric acid and a temperature of 45° C., the take-up or spinning speed was 50 meters per minute and the spin bath flow was 2 to 3 meters per minute. The filaments as spun were about 3 denier and had a tenacity of 2.76 grams per denier, an elongation of 75.3% and a tensile factor of 24 (average of 45 filaments).

Example IV

The procedure of Example I was followed except that the spin bath had a concentration of 50.3% by weight of sulfuric acid and a temperature of 40° C., and the spinning speed was 48 meters per minute. The filaments as spun were of 3.7 denier per filament and had a tenacity of 1.9 grams per denier, an elongation of 129% and a tensile factor of 21 (average of 20 filaments).

The curves shown in FIGURE 1 define areas of concentration and temperature of spin bath at which filaments having particularly desirable properties are obtained. Curve A defines the limit of spin bath concentration and temperature above which filament breakage often occurred because of the richness of the spin bath. Curve B defines the limits of spin bath concentration and temperature within which filaments having the best properties were obtained. Curves C, D and E indicate the spin bath concentration and temperatures at which filaments having a tensile factor as spun of approximately 10, 15 and 20 respectively were obtained based on data obtained as in the above examples wherein the polymer was polyhexamethylene terephthalamide having an inherent viscosity in sulfuric acid of about 1, the filaments were between 2 and 4 denier per filament and the spinning speed was in the range of 42 to 54 meters per minute. Curves B, C, D and E also define spin bath conditions at which particularly suitable filaments of other polymers, e.g. poly (polyalkylene) terephthalamides such as polytetramethylene terephthalamide, are obtained. Thus good filaments are obtained using spin bath concentrations at temperatures in the closed areas defined by curves A and B, better fibers are obtained when spin bath conditions are in the enclosed area defined by curves A and C, still better fibers are obtained in the area defined by curves A and D and the best filaments are obtained when spin bath conditions are in the enclosed area defined by curve E.

Although curves B, C, D and E of FIGURE 1 were determined using certain values of spinning speed and denier per filament, the latter conditions may be varied within wide limits and the advantages of the invention still obtained. For example, spinning speed may suitably be within the range of 30 to 150 meters per minute and the denier per filament within the range of 0.2 to 20.

The mechanical properties of the shaped articles e.g. filaments, produced according to the process of this invention may be improved by drawing or stretching the filament, preferably at elevated temperature, and then annealing. For example, the filament may be drawn to 0 to 500% increase in length at a temperature of about 20° C. to about 20° C. below the melting point of the polymer. Such drawing causes the molecules making up the shaped article, e.g. filaments, to become somewhat oriented. Crystallinity may be subsequently induced by annealing at an elevated temperature, e.g. 270° C. for 5 minutes in the case of polyhexamethylene terephthalamide. These steps result in the improvement of mechanical properties noted including high wet stiffness at temperatures up to 100° C.

The filament may be drawn in air or in a second bath of a liquid medium, e.g. water containing 0 to 30% of sulfuric acid at temperatures up to the boling point of the liquid. The latter system is economical and practical to apply to a continuous stretching operation carried out directly on the spinning machine. Other liquid media which may be used for stretching are: tetralin, toluene, heptane, benzene, methanol, methanol/water mixtures, acetone, acetone/water mixtures, ethylene glycol, etc.

To illustrate the effect of drawing, the filament of Example III was drawn in water at 55° C. to a denier per filament of 2.18, a tenacity of 4.0 grams per denier, and an elongation of 18% (average of 10 filaments). The same filaments were drawn over a metal shoe at 270 to 290° C. to a denier per filament of 1.9, a tenacity of 6.0 grams per denier and an elongation of 11.5% (average of 10 filaments).

Example V

This example illustrates the effect of immediately stretching and orienting yarn produced according to this invention as it is spun.

A solution in sulfuric acid of 15% by weight of polyhexamethylene terephthalamide having an inherent viscosity of 1.3 measured in sulfuric acid, said solution having a viscosity of 2400 poises at 28° C. was spun as in Example I using a spin bath of aqueous sulfuric acid having a concentration 49% by weight of sulfuric acid and at a temperature of 45° C. to produce a 3 denier filament. The yarn was taken up by passing over a positively driven roll just at the exit of the spinning trough at 60.9 meters per minute. The yarn then traveled directly from said roll through a 20 inch bath of water at 55° C. and was taken up by a second positively driven roll at 70 meters per minute for a 15% stretch. The resulting yarn had a tenacity of 4.4 grams per denier, an elongation of 28% and a tensile factor of 23 (average of 10 single filaments). It was found to be well oriented by X-ray diffraction.

*Example VI*

This example illustrates the spinning of multi-filament yarn according to this invention.

The procedure of Example I was followed using the spinning solution of Example V except that the spinning solution was extruded through a 10-hole jet, each hole having a diameter of 100 microns, into a spinning tube having a length of 26 inches and an inside diameter of 10 mm. The spin bath was aqueous sulfuric acid having a concentration of 47.8% by weight and a temperature of 46.5° C., the spinning speed was 80 meters per minute and the spin bath flow was 21.5 meters per minute. The resulting 3 d.p.f. 10 fil yarn had a tenacity of 2.2 grams per denier, an elongation of 95% and a tensile factor of 21.5 (average of 20 single filament tests).

*Example VII*

15 parts of polyhexamethylene terephthalamide prepared as in the previous examples and having an inherent viscosity of 1.05 measured in concentrated surfuric acid was dissolved in 85 parts of concentrated sulfuric acid of 96 percent by weight concentration at room temperature. The dope which had a viscosity of 2900 poises at 23° C. was clarified by centrifugation. The dope was wet spun as described in the previous example into a spin bath at 22° C. consisting of aqueous forming acid of 68 percent by weight formic acid. The yarn was led from the bath onto a roll rotating at a peripheral speed of 10 meters per minute. The yarn was washed acid free and then drawn in either a water bath of 55° C. or over a hot shoe at 270° C. The yarn, as spun had a denier per filament of 6.5, a tenacity of .72 gram per denier, an elongation of 132% and a modulus of 19.8 grams per denier. The yarn drawn 117% in water at 55° C. had a denier per filament of 3.0, a tenacity of 1.95 grams per denier, an elongation of 32%, and a modulus of 37.3 grams per denier. The yarn drawn over a hot shoe at 270° C. had a denier per filament of 3.6, a tenacity of 2.55 grams per denier, an elongation of 7.8% and a modulus of 52.0 grams per denier.

*Example VIII*

The procedure of the preceding example was repeated except that the spin bath was aqueous acetic acid containing 56% by weight of acetic acid and was at a temperature of 20° C. The yarn as spun had a denier per filament of 12.1, a tenacity of 0.57 gram per denier, an elongation of 99.3% and a modulus of 23.8 grams per denier. The yarn drawn 147% in water at 55° C. had a denier per filament of 4.9, a tenacity of 2.31 grams per denier, an elongation of 23.2%, and a modulus of 42.1 grams per denier. The yarn drawn over a hot shoe at 270° C. had a denier per filament of 3.88, a tenacity of 3.62 grams per denier, an elongation of 10.1% and a modulus of 60.0 grams per denier.

*Example IX*

This example illustrates the spinning of polytetramethylene terephthalamide.

A polymer having an inherent viscosity of 1.56 measured in concentrated sulfuric acid was prepared from tetramethylene diamine and terephthaloyl chloride using the interfacial technique with magnesium oxide as an acid binder as described in Example I. The polymer was dissolved at room temperature in concentrated sulfuric acid of 96% by weight concentration to obtain a spinning solution containing 14.2% by weight of polymer and having a viscosity of 4030 poises at 25° C. The solution was extruded into a spin bath of aqueous sulfuric cid of 46.5% by weight concentration and which was at a temperature of 50° C., using the spinning procedure of Example I. The filament as spun after washing and drying had a denier of 3.4, a tenacity of 1.9 grams per denier, an elongation of 68%, and a tensile factor of 16 (average of 10 single filaments).

*Example X*

This example illustrates the spinning of polyethylene terephthalamide.

A polymer having an inherent viscosity of 1.18 measured in concentratied sulfuric acid was prepared from ethylene diamine and terephthaloyl using the interfacial technique with magnesium oxide as an acid binder as described in Example I. The polymer was dissolved at room temperature in concentrated sulfuric acid of 96% by weight concentration to obtain a spinning solution containing 17.8% by weight of polymer and having a viscosity of 2040 poises at 25° C. The solution was extruded into a spin bath of aqueous sulfuric acid of 47.4% by weight concentration and which was at a temperature of 50° C., using the spinning procedure of Example I except that a conical tube was used in place of the parallel plates to prevent turbulence. The filament as spun after washing and drying had a denier of 2.5, a tenacity of 1.3 grams per denier, an elongation of 92%, and a tensile factor of 13 (average of 10 filaments).

In accordance with another aspect of the invention the polymer solution in concentrated sulfuric acid is spun in a generally downward direction, preferably vertically downward. It has been found that this spinning method is particularly effective in reducing filament rupture and adhesion of filaments to each other.

In spinning in a downward direction, the filaments in the spin bath may be conveniently pulled around an obstacle, e.g. a deflecting rod, pin, idler or positively driven roll or other kind of guide. The filaments may then be pulled through the spin bath in an upslanting direction and taken up, for example, by positively driven take-up rolls above the surface of the spin bath. The filaments preferably define an acute angle around said guide.

An example of apparatus which may be used to carry out a vertically downward spinning process as described above is schematically shown in section in FIGURE 2. Spinning solution is pumped through pipe 10 to spinneret 11 which is below the surface 12 of the spin bath in trough 13. The solution extruded from the orifices of spinneret 11 is coagulated into filaments 14 which are pulled around guide 15 and then taken up by positively driven godet roll 16. Tension exerted on the filaments by roll 16 may allow for a considerable degree of drawing of the filaments to take place in the spin bath between guide 15 and roll 16. Moreover, friction between the filaments and guide 15 prevents an undue proportion of this tension from being translated to the filaments in the vicinity of spinneret 11 where they may be somewhat tender. The downspinning system of FIGURE 2 allows for substantial residence time of the filaments in the spin bath before they are pulled around guide 15 so that they are considerably coagulated before a large degree of drawing takes place. The liquid of the spin bath is circulated through outlet and inlet openings (not shown) in trough 13. The liquid is in general circulated at a rate such that substantial overall variations in its composition are minimized. However, the rate of circulation is preferably low enough so that the body of the liquid making up the spin bath remains apparently quiescent, although it is slowly moving in a general direction from inlet to outlet. The angle α formed by the filaments around guide 15 may be varied, for example, within the range of 5 to 70° and the distance A from the face of the spinneret 11 to guide 15 may be varied, for example, within the range of 12 to 200 inches preferably 20 to 70 inches. Guide 15 may be made of any material inert to the aqueous sulfuric acid or other coagulant, e.g. "Alsimag," (an abrasion-resistant alloy of aluminum, silicon and magnesium) polytetrafluoroethylene, e.g. "Teflon," polyethylene, porcelain, stainless steel or any hard material resistant to attack from the spin bath. The filaments from roll 16 are then subsequently treated as desired, e.g. by further drawing which may be cold or hot and wet or dry, washing, drying and packaging.

Figure 2:
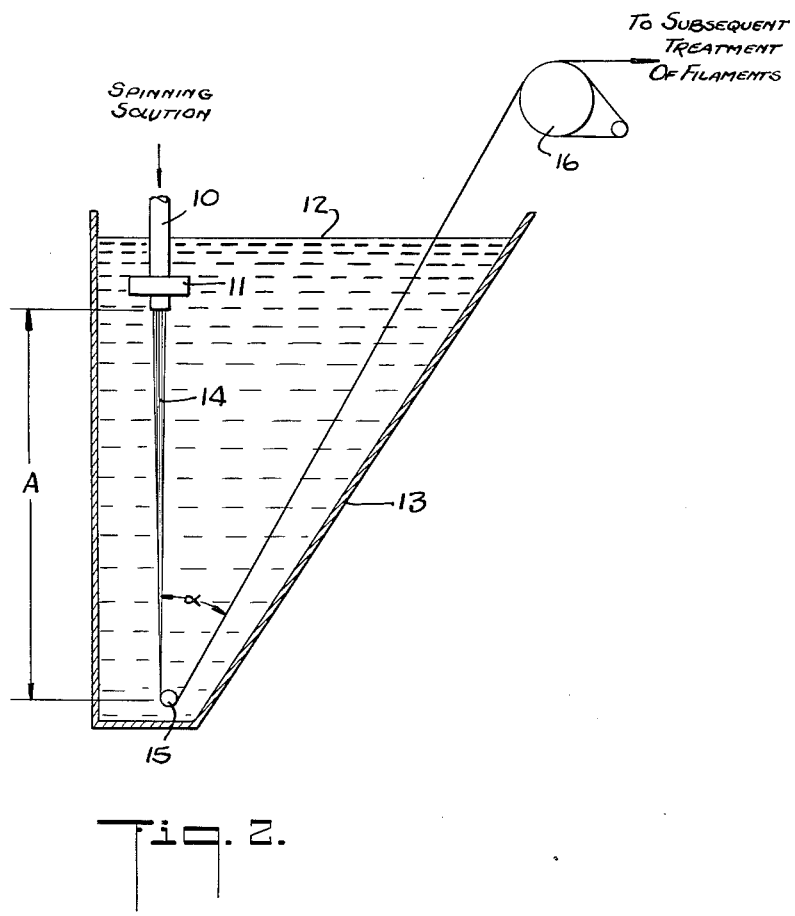

The spinning process is carried out such that the drawdown ratio of the filaments at the first take-up roll e.g., roll 16 in the apparatus of FIGURE 2, is for example with the range of 1 to 15. The drawdown ratio is defined as the ratio of the denier of the dry polymer in the extruded stream, i.e. the weight of dry polymer in a stream of spinning solution 9000 meters long and having the same cross-section as the orifice, to the denier of the taken up filament.

In addition to the method illustrated in FIGURE 2, other methods of downspinning may be employed, e.g., utilizing a U-tube.

The following examples further illustrate the process of the invention as carried out with the apparatus of FIGURE 2.

*Example XI*

Polyhexamethylene terephthalamide made as described in Example I and having an inherent viscosity of 1.3 and a particle size no greater than 40 mesh was added to concentrated sulfuric acid of 97.5% concentration at room temperature and the composition was mixed until a solution containing 13% by weight of polymer was obtained. After deaeration by centrifugation, the solution had a Synchro-Lectric viscosity of 1470 poises at 25° C. The solution was filtered to reduce the undissolved particles having a dimension over 10 microns to less than about ten per cubic millimeter of solution and was then pumped to a platinum/rhodium spinneret at 25° C. containing 10 circular holes each 100 microns in diameter and arranged in a single circle, through which the solution was extruded in a vertically downward direction as shown in FIGURE 2. Although the spinning solution was at room temperature prior to being pumped to the spinneret, it was heated to about the temperature of the bath while it was within the spinneret prior to its being extruded. The liquid of the spin bath was aqueous sulfuric acid of 49.5% by weight concentration and was at a temperature of 45° C. and was circulated by injecting it into trough 13 at an inlet opening near the bottom and withdrawing it through an outlet near the top. The yarn was drawn around an "Alsimag" rod as guide 15, which was located 31 inches from the spinneret, at an angle α of 50°, and was taken up by roll 16 at a speed of 30 meters per minute and a drawdown ratio of about 7 to 1. The yarn was washed with water at 65° C. on skewed rolls until acid free and was collected on a bobbin and dried at room temperature.

The yarn had a total denier of about 30, a tenacity of 3.0 grams per denier, an elongation of 53% and a tensile factor of 22.0 (average of 10 single filaments). It was composed of polymer having an inherent viscosity of 1.15.

*Example XII*

The procedure of Example XI was repeated except that the yarn was taken up by roll 16 at a speed of 60 meters per minute at the same drawdown ratio, i.e., 7 to 1. The yarn had a total denier of 30, a tenacity of 3.4, an elongation of 36% and a tensile factor of 20.6 (average of 10 single filaments). It was composed of polymer having an inherent viscosity of 1.15.

*Example XIII*

The procedure of Example XI was repeated except that the initial polymer had an inherent viscosity of 1.38, the spinning solution contained 12.5% by weight of polymer and had a Synchro-Lectric viscosity at 25° C. of 1430 poises, the spinneret contained 40 holes each 100 microns in diameter arranged in a single circle, guide 15 was located 31.5 inches from the spinneret, the angle α defined by the yarn around guide 15 was 50°, and the yarn was taken up by roll 16 at a drawdown ratio of about 14 to 1. The yarn had a total denier of about 60, a tenacity of 4.41 grams per denier, an elongation of 30.2% and a tensile factor of 24.2 (average of 5 single filaments).

*Example XIV*

The procedure of Example XIII was followed except that the yarn was taken up at roll 16 at 27.3 meters per minute, passed through a 20 inch long water bath at 65° C., and taken up at 30 meters per minute at a drawdown ratio of about 14 to 1 by the positively driven rolls at the exit end of the water bath for a stretch of 10%. The yarn had a total denier of about 60, a tenacity of 4.80 grams per denier, an elongation of 25.9% and a tensile factor of 24.4 (average of 5 single filaments).

*Example XV*

The procedure of Example XIII was followed except that the spinning solution contained 14% by weight of polymer and had a Synchro-Lectric viscosity at 25° C. of 3470 poises, and the yarn was taken up by roll 16 at a speed of 50 meters per minute and at a drawdown ratio of about 14 to 1. The yarn had a total denier of about 60, a tenacity of 4.18 grams per denier, an elongation of 26.8% and a tensile factor of 21.6 (average of 5 single filaments).

*Example XVI*

The procedure of Example XV was repeated except that the yarn was taken up by roll 16 at a speed of 45.5 meters per minute and was stretched 10% in a water bath at 65° C. as described in Example XIV, and taken up at 50 meters per minute at a drawdown ratio of 7 to 1 by positively driven rolls at the exit end of the water bath. The yarn had a total denier of about 60, a tenacity of 4.32 grams per denier, an elongation of 24.5% and a tensile factor of 21.4 (average of 5 single filaments).

The sulfuric acid wet spinning process of this invention may be used to produce filaments of polyhexamethylene terephthalamide having very desirable properties. For example, filaments may be obtained having the following properties.

(A) Tenacity of dry filament of at least 2 grams per denier and up to 10 grams per denier or higher.

(B) Elongation of dry filament of at least 6% and up to 60% or higher.

(C) Tensile factor of dry filament of at least 10 and in many cases, at least 15, 20 or 25.

(D) Modulus of dry filament at least 20 and up to 150 grams per denier or higher.

(E) Average temperature coefficient of modulus per unit of initial modulus of dry filament in the range of 20 to 160° C. of less than 0.005 per degree centigrade.

(F) Average temperature coefficient of modulus per unit of initial modulus of water wet filament in the range of 20 to 95° C. of less than 0.01 per degree centrigrade.

(G) Ratio of modulus of water wet filament to modulus of dry filament, both at 23° C. of at least 0.7.

(H) Ratio of modulus of water wet filament at 95° C. to modulus of dry filament at 23° C. of at least 0.3.

(I) Two glass transition temperatures as determined by a minimum in the curve of work recovery at 1% extension versus temperature, one in the range of 60 to 70° C. and a second in the range of 160 to 170° C.

(J) No decrease in work recovery with increasing temperature at 5% extension in the range of 20 to 130° C.

(K) Permanent set lower than 7% at 130° C. following a 5% extension.

(L) Substantial resistance to degradation under various conditions. For example, filaments of polyhexamethylene terephthalamide may be produced with the process of this invention which retain the percentage of their strength indicated when subjected to the following treatments:

(a) Heating in air at 150° C. for 120 hours—85 to 100%.

(b) Radiation with ultra-violet rays from an unfiltered Hanovia mercury arc lamp for 120 minutes at a distance of 5.5″—70 to 84%.

(c) Contact with a 3% aqueous solution of sodium hydroxide at 95° C. for 2 hours—85 to 100%.

(d) Contact with dilute hydrochloric acid (1% concentration) at 23° C. for 65 hours—85 to 100%.

(e) Contact with 99% formic acid at 23° C. for 65 hours—85 to 100%.

(f) Contact with 99% formic acid at 90° C. for 1 hour—85 to 100%.

(g) Contact with glacial acetic acid at 23° C. for 65 hours—85 to 100%.

(h) Contact with 25%, 50% or 100% acetic acid at 90° C. for 1 hour—85 to 100%.

(i) Standard bleaching treatment with sodium hypochlorite bleach in accordance with the Test Method of the American Association of Textile Chemists and Colorists, using a solution containing 0.25% available chlorine at a temperature of 90° C. and a treating time of 60 minutes—70 to 84%.

(j) Standard nylon bleaching treatment with Textone-formic acid bleach as described in the DuPont Nylon Technical Manual—70 to 84%.

*Example XVII*

The procedure of Example XI was repeated except that the concentration of the liquid of the spin bath was 49%, the yarn was taken up by roll 16 at a speed of about 27 meters per minute, passed through a 20 inch long water bath at 65° C. and taken up by two positively driven rolls at the exit of the water bath at a speed of 30 meters per minute for a stretch of 11% in the water bath, prior to washing and drying. The drawdown ratio of the yarn at the rolls on the exit end of water bath was about 7 to 1. The yarn which had a total denier of about 30 was immersed in boiling water for 1 hour and air dried after which it was found to have the following properties:

(A) Tenacity of dry filament of 3.76 grams per denier.
(B) Elongation of dry filament of 31.2%.
(C) Tensile factor of dry filament of 21.0.
(D) Modulus of dry filament of 44.0 grams per denier.
(E) Average temperature coefficient of modulus per unit of initial modulus of dry filament in the range of 20 to 160° C. of 0.0038 per degree centigrade.
(F) Average temperature coefficient of modulus per unit of initial modulus of water wet filament in the range of 20 to 95° C. of 0.0087 per degree centigrade.
(G) Ratio of modulus of water wet filament to modulus of dry filament, both at 23° C., of 0.83.
(H) Ratio of modulus of water wet filament at 95° C. to modulus of dry filament at 23° C., of 0.32.
(I) Two glass transition temperatures, one at 60–70° C. and another at 160–170° C.

The yarn of this example was suitable for the manufacture of staple fiber, e.g., for use in textiles.

*Example XVIII*

The procedure of Example XIII was repeated except that the viscosity of the spinning solution was 1440 poises at 25° C., the distance of the spinneret from guide 15 was 33 inches, the yarn was taken up by roll 16 at a speed of about 29.6 meters per minute, passed through a 20 inch water bath at 65° C. and taken up by two positively driven rolls at the exit of the water bath at a speed of 30 meters per minute for a stretch of 3% in the water bath. The drawdown ratio of the yarn at the take-up rolls at the exit end of the water bath was about 8 to 1.

The yarn which initially had a total denier of about 104 was hot drawn by passing it over a flat, 12 inch, chrome plated aluminum block heated to 300° C. as measured by a thermocouple situated ¼″ below the top surface of the block. The yarn was fed to the block by a feed roll at 12.1 meters per minute and was taken up by a draw roll at 16.1 meters per minute for a draw ratio of 1.33. The hot drawn yarn had the following properties:

(A) Tenacity of dry filament of 6.35 grams per denier.
(B) Elongation of dry filament of 9.0%.
(C) Tensile factor of 19.1.
(D) Modulus of dry filament of 88.0 grams per denier.
(E) Average temperature coefficient of modulus per unit of initial modulus of dry filament in the range of 20 to 160° C. of 0.0028 per degree centigrade.
(F) Average temperature coefficient of modulus per unit of initial modulus of water wet filament in the range of 20 to 95° C. of .0043 per degree centigrade.
(G) Ratio of modulus of water wet filament to modulus of dry filament, both at 23° C., of 1.0.
(H) Ratio of modulus of water wet filament at 95° C. to modulus of dry filament at 23° C. of 0.55.
(I) Two glass transition temperatures, one at 60–70° C. and another at 160–170° C.
(J) No decrease in work recovery with increasing temperature at 5% extension in the range of 20 to 130° C.
(K) Permanent set at 130° C. following a 5% extension of 4.8%.

In addition, the resistance of the filament to degradation before hot drawing as measured by retention of strength after being subjected to treatments (a) to (j) listed under (L) above was within the range indicated after the description of each test.

The hot drawn yarn of this example is suitable for industrial applications, e.g., in the manufacture of tire cord.

The yarn produced in Examples XI to XVIII was lustrous and the individual filaments had cross-sections which were round and smooth. The yarn was amorphous as indicated by X-ray analysis, but showed a high degree of axial orientation.

The downspinning process exemplified in Examples XI to XVIII results in a greater degree of uniformity of filaments than is the case with other methods of spinning.

The tenacities, elongations and moduli given in the examples were measured with an Instron Tensile Tester at a 3⅓ inch gauge length and a 60% per minute strain rate (rate of fiber extension). Unless otherwise indicated, the filament was tested in air at 23° C. and 65% relative humidity. The tensile properties of filaments at temperatures above room temperature were obtained with the filament in an oven designed to operate in conjunction with the Instron Tester. The properties of water wet filament were determined with the filament immersed in an internally heated water tank during testing. The tensile properties of dry filament in Examples XVII and XVIII represent averages of 20 determinations, while the tensile properties of wet filament in these examples are averages of 10 determinations.

The glass transition temperatures listed under (I) in Examples XVII and XVIII were determined as minima in work recovery at 1% extension. The work recovery of the filament was determined by extending the filament to 1% of its original length with the Instron Tensile Tester at a rate of 10% extension per minute and charting a stress-strain curve. The filament was then allowed to contract at the same rate by reversal of the crosshead direction and another stress-strain curve was obtained by reversing the direction of chart travel with the crosshead. The two curves formed a hysteresis loop. The percent recoverable work, i.e. work recovery was obtained by dividing the area under the second curve (recovery cycle) by the area under the first curve (strain cycle) and multiplying by 100. The work recovery was obtained in this manner at room temperature and at higher temperatures in increments of 20° C. to temperatures in excess of 170°. At temperatures above room temperature the aforementioned oven designed to operate in conjunction with the Instron was used, and the force of entropic contraction initially developed as a result of the higher temperature was subtracted from all values of stress in determining the areas under the curve, i.e., a horizontal line equal to the force of entropic contraction was drawn under the stress-strain curves and the areas between said curves and said line was used in determining the work recovery. The values of work recovery were plotted against temperature and the minima in the curve obtained represented the glass transition temperature.

The values of work recovery and permanent set indicated under (J) and (K) of Example XVIII were determined using the procedure set out in a 1960 Preprint of Committee D-13 on Textile Materials of the American Society for Testing Materials entitled "Tentative Method of Test for Elastic Properties of Uncrimped Fibers, ASTM Designation D-60T", except that a 60% per minute rate of extension and relaxation was used.

The inherent viscosity given for the polymers of the examples represents the function ln $\eta r/c$ where ln $\eta r$ is the natural logarithm of $\eta r$, the relative viscosity of a very dilute solution of the polymer in concentrated sulfuric acid 25° C., and $c$ is the polymer concentration in grams per deciliter of solvent. The inherent viscosity is thus obtained in deciliters per gram. The inherent viscosity of the polymers of Examples I to X was determined using a concentration of 0.1 gram per deciliter of sulfuric acid, and that of the polymers of Examples XI to XVIII using a concentration of 0.4 gram per deciliter.

It is to be understood that the foregoing detailed description is given merely by way of illustration and that many variations may be therein without departing from the spirit of my invention.

Having described my invention what I desire to secure by Letters Patent is:

1. A process of extruding a solution in concentrated sulfuric acid of at least 80% by weight acid concentration, of a poly(polymethylene) terephthalamide, the polymethylene groups of which contain 2 to 10 carbon atoms, into a spin bath of aqueous sulfuric acid having a concentration and temperature within the area enclosed by curves A and B of FIGURE 1, such that the polymer is coagulated into a shaped article.

2. The process of claim 1 wherein said shaped article is stretched in an amount up to 500% increase in length at a temperature of 20° C. to 20° C. below the melting point of the polymer.

3. A process comprising wet spinning a solution of polyhexamethylene terephthalamide in concentrated sulfuric acid of at least 80% by weight concentration by extruding said solution into a spin bath of aqueous sulfuric acid having a concentration and temperature within the area enclosed by curves A and C of FIGURE 1.

4. The process of claim 3, wherein the filamentary material obtained is drawn in an amount up to 500% increase in length at a temperature of 20 to 330° C.

5. The process of claim 3, wherein the filamentary material obtained is drawn in an amount up to 500% increase in length in a second bath of water containing 0 to 30% sulfuric acid at a temperature up to the boiling point of said second bath.

6. The process of claim 3 wherein the concentration and temperature of the spin bath are within the area enclosed by curves A and D of FIGURE 1.

7. The process of claim 3, wherein the concentration and temperatures of the spin bath are within the area enclosed by the curve E of FIGURE 1.

8. The process of claim 7, wherein the filamentary material obtained is drawn in an amount up to 500% increase in length in a second bath of water containing 0 to 30% sulfuric acid at a temperature up to the boiling point of said second bath.

References Cited by the Examiner

UNITED STATES PATENTS

| | | | |
|---|---|---|---|
| 2,071,251 | 2/1937 | Carothers | 18—54 |
| 2,359,877 | 10/1944 | Schupp | 260—30.8 XR |
| 2,360,406 | 10/1944 | Dreyfus | 18—54 |
| 2,393,972 | 2/1946 | Cairns | 18—54 |
| 2,489,569 | 11/1949 | Foulds | 18—54 |
| 2,517,694 | 8/1950 | Merion | 28—82 |
| 2,628,886 | 2/1953 | Bamford | 18—54 |
| 2,715,763 | 8/1955 | Marley | 28—82 |
| 2,925,405 | 2/1960 | Laasko | 18—54 XR |
| 3,040,003 | 6/1962 | Beaman | 260—32.6 XR |

OTHER REFERENCES

Polymers and Resins by Golding, pp. 653–655; published in 1959 by D. Van Nostrand Co., Inc.

ALEXANDER H. BRODMERKEL, *Primary Examiner.*

WILLIAM STEPHENSON, MAURICE BRINDISI, MORRIS LIEBMAN, *Examiners.*